ns United States

Deeg

[11] 4,035,527

[45] July 12, 1977

[54] METHOD OF PROVIDING A PHOTOTROPIC LAYER ON A CARRIER

[75] Inventor: Emil W. Deeg, Woodstock, Conn.

[73] Assignee: American Optical Corporation, Southbridge, Mass.

[21] Appl. No.: 527,987

[22] Filed: Nov. 29, 1974

[51] Int. Cl.$^2$ .............. G02B 5/23; B05D 5/06
[52] U.S. Cl. ........................... 427/169; 427/164; 350/160 P; 106/DIG. 6
[58] Field of Search ............ 350/160 P; 156/106; 106/DIG. 6; 427/167, 166, 162, 168, 169

[56] References Cited

U.S. PATENT DOCUMENTS

| | | | |
|---|---|---|---|
| 3,208,860 | 9/1965 | Armistead et al. | 350/160 P X |
| 3,875,321 | 4/1975 | Gliemeroth et al. | 350/160 P X |

OTHER PUBLICATIONS

Mader; K., "Photochromic Spectacle Lens" Manufacturing Optics International, Jan. 1973, pp. 34–38.
Perveyev; A. F. et al., "AgCl–CuCl Photochromic Coatings," Soviet Journal of Optical Technology, Feb. 1972, pp. 117–118.

*Primary Examiner*—John K. Corbin
*Assistant Examiner*—Rolf Hille
*Attorney, Agent, or Firm*—H. R. Berkenstock, Jr.; William C. Nealon

[57] ABSTRACT

A laminated optical or ophthalmic element is produced comprised of an amorphous and/or crystalline material possessing phototropic or photochromic properties as a result of applying a thin layer over at least one surface thereof, which layer includes a combination of cations and anions including silver or copper bromide and/or chloride.

4 Claims, No Drawings

METHOD OF PROVIDING A PHOTOTROPIC LAYER ON A CARRIER

BACKGROUND

It is considered desirable to provide glassy, amorphous and/or crystalline material which possesses phototropic or photochromic properties. Particular utility for such a product is found in sunglasses. As is well-known, there are two primary markets for sunglasses; namely, Rx or prescription and plano. The plano is usually a less expensive product which may be used by those persons not requiring vision correction. The Rx lens is used by those requiring correction. The present invention has utility in either the Rx prescription or plano market. It is also usable with image display and storage systems, photochromic windows, and the like.

THE PUBLISHED PATENTS

The following patents are not directly related to ophthalmic or optical applications but are believed pertinent published patents: U.S. Pat. No. 3,607,320 is directed to a phototropic glass or ceramic article. U.S. Pat. No. 2,770,922 relates to radiation colorable chromium glass usable as a dosimeter for monitoring high energy radiation. U.S. Pat. No. 3,541,330 is directed to a photochromic glass-image storage arrangement. U.S. Pat. No. 3,428,396 is directed to a photochromic glass image display and storage system. U.S. Pat. No. 3,406,085 is concerned with a photochromic window utilizing a photochromic glass. U.S. Pat. No. 3,508,810 is concerned with an organic photochromic system and describes a sandwich consisting of a pair of transparent glass sheets sealed together by means of a resin containing a dissolved photochromic material, i.e., a spiropyran. U.S. Pat. No. 3,436,144 is concerned with photochromic materials and devices and in particular metal cyanimide and organic dye indicators. U.S. Pat. No. 3,407,145 is concerned with photochromic means and methods and in particular trimethyl-1,3, 3-indoline, 2-spiro - 2' 2H pyrodino - 2,3-(b) pyrans.

The following patents relate to photochromic materials and are pertinent to this invention: U.S. Pat. No. 3,255,026 (a reduced silicate glass with $Ce_2O_3$ — MnO as the photosensitive agent), U.S. Pat. No. 3,269,847 (strongly reduced soda-silicate glass and soda-lime-silicate glass with Eropium and having a wavelength of activating radiation at 575 nanometers), U.S. Pat. No. 3,272,646 (a porous glass using an aromatic diamino tetraacetic acid as a photosensitive agent), U.S. Pat. No. 3,278,319 (a strongly reduced soda-silicate glass and soda-lime-silicate glass with up to 25% by weight of cerium), U.S. Pat. No. 3,615,771 (cadmium-silica-borate glass with either silver or copper oxide sensitizer), U.S. Pat. No. 3,664,725 (a glass body including trivalent erbium and using trivalent ytterbium and/or neodymium as a sensitizer), U.S. Pat. No. 3,197,296 (alumina-boro-silicate with some lead, alkali and fluoride with a sensitizer agent of such as silver chloride, bromide or iodide and copper as a sensitizer), U.S. Pat. No. 3,208,860 (a base glass of a silicate, boro-silicate, or aluminaboro-silicate with silver chloride, bromide or iodide and copper as a sensitizer), U.S. Pat. No. 3,306,833 (comparable to 3,208,860 above), U.S. Pat. No. 3,325,299 (a silver-free silicate glass but comparable to U.S. Pat. No. 3,208,860 above), U.S. Pat. No. 3,328,182 (comparable to U.S. Pat. No. 3,208,860), U.S. Pat. No. 3,419,370 (aluminaboro-silicate plus 5% by weight of silver halides and sensitizers), U.S. Pat. No. 3,449,103 (similar to 3,208,860), U.S. Pat. No. 3,548,060 (borate or alumina-alkaline-earth borate type glass with silver halides plus copper sensitizer), U.S. Pat. No. 3,594,198 (borate, silica-borates with potassium and silver halides), U.S. Pat. No. 3,615,761 (phosphate, barium aluminum phosphate, thallous halide and copper as the photosensitive system), U.S. Pat. No. 3,617,316 (comparable to 3,548,060 above but with small amounts of zinc oxide, lead oxide, and 1–5% by weight of silica), U.S. Pat. No. 3,630,765 (tantalum aluminum borosilicate with 10–30% by weight of cesium oxide and a silver halide and copper photosensitive system).

In addition, U.S. Pat. Nos. 3,540,793 and 3,653,863 are of interest. These patents disclose polarizing photochromic glasses utilizing elongated parallel oriented silver halide crystals as the active agent.

Various of the above patented systems require critical chemistry or batch parameters such as control of reduceable metal content, absence of trace elements, lack of ultraviolet absorbing ions, plastic or like layers as a protective coating, control of pore size, requirement of batch processing rather than continuous processing, exposure to x-rays or gamma-rays or the like to nucleate or otherwise modify included materials, heat treatment to precipitate submicroscopic crystals such as silver halide crystals, diffusion of chemicals into base glass, thickness control for the articles or substrates, control of refractive indexes and various combinations of the foregoing.

In known glass compositional systems including a halide as a constituent, increased corrosion of pressing tools, for example, when making blanks, can be expected. Special alloys have to be used or a reduced tool lifetime must be accepted. Slight variations of halide and sensitizer contents in certain glasses can result in significant changes in the response or recovery time from a clear to an activated transmission state. (This can be most undesirable in a sunglass). Furnace atmosphere and glass chemistry and subsequent heat treatment have to be continuously monitored because of the criticality of halide content in the final product.

Volatilization of halides in the fabrication of certain of the above products (also borates) requires personnel protection to an increased degree and additional facilities for ventilating furnace areas and filtering furnace exhaust gases to prevent ecological contamination.

Many of the above patented systems require specialized substrates or base materials containing relatively precise quantities of specified chemicals, such as halides, for example. The manufacture of such glasses is very difficult on a large scale and may require such unusual process treatments as bubbling chlorine gas or the like through melts plus subsequent treatment as, for example, heat treatment, irradiation or the like.

The present invention has among its objects elimination of many of the foregoing difficulties and provision of a composite system or product exhibiting reversible optical density change. It is a further object of the invention to provide an arrangement for deposition of a phototropic or photochromic layer on substantially any ophthalmic or optical glass or plastic lens. It is a further object to provide a phototropic or photochromic layer on a glass or plastic optical or ophthalmic lens.

Yet another object is to provide amorphous and/or crystalline material possessing phototropic or photochromic properties such that after excitation with ultraviolet or shortwave visible light there is a change in the light transmission characteristics of such a material.

Briefly, according to a preferred embodiment of the invention there is provided means to produce a phototropic or photochromic silver halide activated coating for glass or plastic optical or ophthalmic lenses. These coatings or thin films can be fabricated, for example, by multiple electron beam vacuum deposition. These films can include a considerably higher concentration of such as silver halide crystals than specificed in published patent systems of the type above mentioned with related advantages being accomplished.

DETAILED DESCRIPTION OF THE INVENTION

According to one aspect of this invention there is taught the chemical deposition of a thin photochromic or phototropic layer on any type of optical or ophthalmic substrate. For example, the substrate may be a conventional CR-39, or diallyl glycol carbonate, lens. Other useable ophthalmic quality plastics include polymethylmethacrylates or polycarbonates such as "Plexiglas", "Lexan", "Lucite". While the preferred glass substrate is ophthalmic crown glass, similar or identical to composition A, other optical or ophthalmic glasses such as compositions B through L may be used.

EXAMPLE I

The following is an exemplary batch analysis:

| | % |
|---|---|
| $SiO_2$ (as potters flint) | 77.16 |
| $SiO_2$ $\}$ (as $Na_2SiO_3$) $Na_2O$ | 1.97 |
| $Al_2O_3$ (as calcined alumina) | 2.18 |
| KF (as $KHF_2$) | 1.34 |
| $B_2O_3$ (as $B_2O_3$) | 9.81 |
| $Ag_2O$ (as $AgNO_3$) | 4.03 |
| $Na_2O$ (as NaCl) | 1.08 |

For purposes of this invention, an operative glass layer includes 5–60 mol percent $Ag^+$ and 8–85 mol percent of material selected from the group consisting of $Cl^-$, $Br^-$, and mixtures thereof.

All the solid ingredients (that is, all except the silver nitrate and the sodium chloride) were mixed and pulverized in mortar with a pestle. The silver nitrate was dissolved in distilled water. The solution of distilled water and silver nitrate was added to the pulverized batch and mixed thoroughly. the sodium chloride was then added with additional mixing. The batch was dried and repulverized. The batch was then made into pellets on a Clifton-hydraulic press at a gauge pressure of 3,800 pounds per square inch. The resulting pellets were sintered in a conventional electric box-type laboratory furnace at 1600° for 1 hour. Each sintered pellet weighed approximately 3 grams. Eight pellets were made from the foregoing batch. Additional batches were made to manufacture more pellets.

The following table indicates a preferred batch mixture by weight of constituents:

| | Grams |
|---|---|
| Potters Flint | 154.32 |
| $Na_2SiO_3$ | 7.68 |
| $Al_2O_3$ | 4.36 |
| $KHF_2$ | 5.10 |
| $B_2O_3$ | 19.62 |
| $AgNO_3$ | 11.84 |
| NaCl | 4.08 |

EXAMPLE II

An additional batch of the same oxide analysis was prepared and from it 24 additional pellets were prepared at a pressure of 5,200 pounds per square inch on the Clifton press.

Pellets prepared according to either of the foregoing examples are suited for vacuum deposition on either glass or plastic substrates. For example, pellets of the above type are placed in a water-cooled crucible in a vacuum chamber. For example, CR-39 lenses to be used as the substrate are placed inside a water-cooled crucible in a vacuum chamber about 559 millimeters above a crucible in which a pellet prepared according to the above examples is placed and the chamber is pumped down to a high vacuum in a conventional manner, i.e., $6 \times 10^{-6}$ Torr. An electron beam is directed onto a sample until it is partially melted and evaporated. The film thickness is monitored optically by interferometry. More details of this process are found, for example, in copending application Ser. No. 510,270, filed Sept. 30, 1974, by Leei Chang et al, the disclosure thereof being included herein by reference.

According to broader aspects of the present invention, the coating material has an analysis in the following range:

| | A* | B | C | D | E | F | G | H | I | J | K | L |
|---|---|---|---|---|---|---|---|---|---|---|---|---|
| $SiO_2$ | 68.0 | 62.40 | 68.0 | 63.35 | 62.00 | 62.00 | 61.07 | 46.83 | 38.19 | 43.59 | 34.10 | 65.28 |
| $Na_2O$ | 8.5 | 9.02 | 8.2 | 9.35 | 8.72 | 8.72 | 8.37 | 5.65 | 6.74 | 2.59 | 1.90 | 7.27 |
| $K_2O$ | 9.2 | 7.40 | 8.9 | 8.45 | 9.83 | 9.83 | 8.32 | 6.70 | 1.50 | 7.60 | 5.00 | 9.88 |
| CaO | 8.5 | — | 8.5 | — | — | — | — | 4.10 | 6.00 | — | — | — |
| ZnO | 3.5 | 10.84 | 3.0 | 7.75 | 7.90 | 7.90 | 11.74 | 2.00 | — | — | 1.40 | 12.12 |
| $Al_2O_3$ | 1.8 | 2.91 | 1.9 | 2.50 | 2.50 | 2.50 | 4.34 | 1.00 | — | 1.30 | 1.80 | 2.15 |
| $As_2O_3$ | 0.2 | — | 0.5 | 0.25 | 0.25 | 0.25 | — | — | — | — | — | — |
| $Sb_2O_3$ | 0.2 | 0.76 | 0.5 | 0.25 | 0.25 | 0.25 | 0.82 | 1.00 | 0.30 | 0.50 | 0.50 | — |
| $TiO_2$ | 0.4 | 1.00 | 0.5 | 0.75 | 1.20 | 1.20 | — | 3.72 | 4.28 | 1.52 | 4.25 | 0.75 |
| MgO | — | 4.12 | — | 3.25 | 3.25 | 3.25 | 4.22 | — | — | — | — | — |
| $B_2O_3$ | — | 1.00 | — | 1.10 | 1.10 | 1.10 | 1.00 | 5.00 | 2.00 | — | — | — |
| $La_2O_3$ | — | — | — | 3.00 | — | — | — | — | — | — | — | — |
| CdO | — | — | — | — | 3.00 | — | — | — | — | — | — | — |
| BaO | — | — | — | — | — | 3.00 | — | 21.50 | 18.80 | — | — | — |
| $ZrO_2$ | — | — | — | — | — | — | — | 2.50 | 6.00 | 1.50 | 0.90 | — |
| PbO | — | — | — | — | — | — | — | — | 16.19 | 41.40 | 50.15 | — |
| $Fe_2O_3$ | — | — | — | — | — | — | — | — | — | — | — | 2.09 |

*(A above is the preferred glass substrate composition)

| | Wt. % |
|---|---|
| $SiO_2$ | 82–66 |

-continued

|  | Wt. % |
|---|---|
| Na$_2$O | 14-3 |
| Al$_2$O$_3$ | 0-4 |
| KF (a flux) | 0-5 |
| B$_2$O$_3$ | 2-14 |
| AgCl, AgBr, or mixtures thereof | 4-20 |

One of the desirable aspects of forming optical and ophthalmic photochromic or phototropic layers according to this invention is the flexibility which is provided to certain aspects of ophthalmic business. It can simplify warehousing and inventory problems since one can coat clear, as well as colored or tinted, glass or plastic lenses with phototropic materials thus eliminating or reducing requirements for multiple inventories of various glasses. The invention further opens totally new concepts in the photochromic lens art. One can now supply such exotic lenses as purple, green, or other fashion shades which will exhibit photochromicity.

Glasses can be considered to be super-cooled liquids quenched to a solid state at a high enough rate to prevent crystalization. Impurities such as silver halides can act as nucleating agents for localized crystal formation. Large numbers of smaller crystals normally cause opacification of the glass. It is for this reason, among others, that production of lens blanks according to procedures of various of the published patents discussed above are limited to silver halide concentrations of quite low order concentration, i.e., concentrations of less than 0.1 volume percent, for example. Practice of the present invention allows much higher concentrations of silver halide, avoidance of opacification, greater compatibility with a wide variety of optical and ophthalmic substrates without undue concern over indexes of refraction trace impurities in the substrate, differential thermal expansion, and the like.

In the above description we have considered organic and inorganic materials from which one obtains a glass coating by vacuum deposition. Dipping in a solution with subsequent treatment is possible if necessary. Other known techniques may be utilized, for example, including flame apraying of silver halide-containing droplets of the sintered pellets described above on a cold lens.

It should be understood that small amounts of various types of sensitizing agents can be added to the coating compositions according to this invention. For example, such sensitizing agents as copper in the form of a copper chloride or copper bromide or mixtures thereof may be added.

In the foregoing description we have discussed the fabrication of sintered pellets which by vacuum depositions are used to form thin layers on selected optical and ophthalmic substrates. In addition it is possible to fabricate such photochromic or phototropic layers from solutions of soluble metal oxide compounds including such as silver nitrate. For example, such as CR-39 plastic ophthalmic lens can be coated with the following mixture:

EXAMPLE III 13 volume parts of ethanol
4 volume parts of butanol
1 volume part of 40% HNO$_3$
2 volume parts of tetra-ethyl-ortho-silicate
1 volume part of 0.1 molar aqueous solution of copper nitrate and silver nitrate.

This coating can also be applied to the CR-39 lens by dipping in the solution at room temperature for 10 seconds and thereafter being exposed to a halogen, e.g. a mixture of chlorine-and-bromine-vapor-containing air atmosphere during the hardening process.

The hardening process takes place while the dip, or spin, coated lens is placed in a laboratory furnace at a temperature of 93° C. for a period of 30 minutes. After such treatment the coated lens is removed from the furnace and allowed to cool freely at room temperature. Exposure to the halogen-containing atmosphere takes place in complete darkness. It is also advisable to perform the dipping in a darkroom environment using red light illumination only as standard practice in photographic laboratories.

The liquid coating can also be applied by dropping approximately 1 cubic centimeter of the liquid onto the surface of a lens spinning at 2000 rpm. The rotation of the lens is stopped after 5 seconds, the lens is removed from the holder and is exposed to the atmosphere described.

It is possible to replace the mixture ethanol/butanol/-HNO$_3$/tetra-ethyl-ortho-silicate by solutions known in commerce as "Phosphorosilicafilm" and "Borosilicafilm".

The aqueous silver and copper nitrate solutions are added to the quantities described above. These solutions are manufactured by Emulsitone Company, Whippany, N.J.

Whereas the main constituent of the coating prepared from the solution mentioned first is silica, use of the other solutions permits formation of glass coatings consisting essentially of boro-silicates and phospho-silicates as carriers of the photochromic silver halide particles.

In addition to the foregoing, more conventional ophthalmic and optical amorphous and/or crystalline plastics and glasses, other substrates may be used. For example, a glass or plastic lens including a polarizing optical layer therein, as, for example, disclosed in U.S. Pat. No. 3,674,587, may be used.

In conclusion, it may be observed that glasses containing silver halide presently are believed to be important as photochromic or phototropic substances. The carrier of phototropism in these glasses is a separate phase. The present invention provides a means whereby this phase is deposited onto a substrate and still shows phototropic or photochromic behavior. This photochromic or phototropic behavior can be optimized in a thin layer as compared to a plastic or conventional glass optical or ophthalmic lens. According to this thin layer technique, the more unstable silver halide phase is limited to a comparatively thin layer. In addition, formation of an amorphous substance, which according to this invention is the thin layer containing the silver halide crystals, by vacuum deposition allows quenching more rapidly than any other glass-forming technique, known to us at this time, thus avoiding opacification by crystal growth during formation of the amorphous substance.

Other inorganic glasses and optical or ophthalmic quality organic materials or plastics, other than those elsewhere listed, having the mechanical compatibility necessary with the thin coating of the invention are equally usable.

According to the foregoing, we have taught the fabrication of elements or products comprised of an amorphous or crystalline material possessing phototropic properties and comprised of a substrate and a thin coating. After excitation with ultraviolet or shortwave visible light, there is a reversible increase in resistance in light absorption.

To recapitulate: we have provided an amorphous and/or crystalline material, according to this invention, comprised of an optical or ophthalmic quality of organic or inorganic substrate. Over at least one surface of the substrate there is formed a thin phototropic or photochromic glass layer which is capable of a reversible excitation upon exposure to ultraviolet or shortwave visible light. The layer is comprised of a glass matrix which includes 5–60 mol percent of $Ag^+$ and 8–85 mol percent of a halide selected from the group comprised of $Cl^-$, $Br^-$ and mixtures thereof. In addition, the layer may include a minor, but effective amount, of a sensitizer. The most common and the preferred sensitizer is the metal ion $Cu^+$.

The preferred glass for the matrix is selected from the group consisting of silicates, boro-silicates, and phosphosilicates. Practically all usable glasses are listed in the table under the designations A through L under Example I above.

As noted above, the preferred concept according to this invention is an ophthalmic quality sunglass lens having at least one major surface thereof covered by a phototropic layer. The method of preparing a lens is comprised of the following steps: to assure intimate association between the glass matrix carrying the phototropic or photochromic ion system and the optical, or ophthalmic lens, to be coated, the lens must first be cleaned. The necessary clean lens surface can be accomplished in any conventional manner. For example, first washing in an ultrasonic detergent bath, perhaps followed by an ethanol bath and a Freon bath.

Thephototropic material is prepared in a temporary carrier. For example, it may be placed in a sealed meltable pellet or in a solution. The pellet, or solution, is then operatively associated with a clean lens surface. This, for example, operative assocation can be in a vacuum furnace, a solution, by spin casting, all of the systems being above described in more detail. The exposure of the lens to the halide system is under conditions and for a time period sufficient to form a thin, hard, scratch-resistant glass layer over the surface of the lens to be coated. The layer must be substantially uniform and substantially free of undue opacification. Photochromic or phototropic color centers, which are the cause of the reversible coloration, are substantially uniformly distributed through the thin layer. Preferably the glass layer is less than 20 um thick.

Having thus described the invention in detail and with sufficient particularity as to enable those skilled in the art to practice it, what we desire to protect by letters patent is set forth in the following claims.

I claim:

1. That method of rendering at least one major surface of an optical or ophthalmic organic or inorganic lens phototropic comprised of the steps:
   a. preparing a clean lens surface to be treated;
   b. preparing a liquid temporary-carrier of a stable solution of a mixture of silicon containing metal organic compound and a metal organic compound containing boron and phosphorous with nitric acid and copper nitrate and silver nitrate, said mixture being pyrolyzable to form a glassy matrix comprising $SiO_2$, $P_2O_5$, and $B_2O_3$ and mixtures thereof for the phototropic material to be placed on the lens;
   c. exposing the said clean lens surface to said temporary-carrier and phototropic-layer-forming material under conditions capable of depositing a thin, hard, scratch-resistant glass layer over said lens surface, said layer having substantially uniformly distributed therewith color centers which, when subjected to ultraviolet or shortwave visible light exhibit reversible absorption thereof.

2. The method of claim 1 wherein said temporary-carrier is the solution of:
   13 volume parts of ethanol
   4 volume parts of butanol
   1 volume part of 40% $HNO_3$
   2 volume parts of tetra-ethyl-ortho-silicate
   1 volume part of 0.1 molar aqueous solution of copper nitrate and silver nitrate.

3. The method of claim 1 including the step of exposing said lens coated with said temporary-carrier and ingredients for forming a phototropic layer to a halogen to form said phototropic layer.

4. The method of claim 1 wherein said layer is hardened in a furnace having a halogen atmosphere at an elevated temperature.

* * * * *